(12) United States Patent
Hasegawa et al.

(10) Patent No.: US 6,536,414 B2
(45) Date of Patent: Mar. 25, 2003

(54) FUEL INJECTION CONTROL SYSTEM FOR INTERNAL COMBUSTION ENGINE

(75) Inventors: Jun Hasegawa, Kariya (JP); Hisashi Iida, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 35 days.

(21) Appl. No.: 09/852,646

(22) Filed: May 11, 2001

(65) Prior Publication Data

US 2001/0047795 A1 Dec. 6, 2001

(30) Foreign Application Priority Data

May 31, 2000  (JP) ........................................ 2000-166433

(51) Int. Cl.$^7$ .............................................. F02D 41/04
(52) U.S. Cl. ...................... 123/478; 701/104; 701/105; 123/492; 123/493
(58) Field of Search ................................. 123/478, 492, 123/493; 701/104, 105

(56) References Cited

U.S. PATENT DOCUMENTS

| | | | |
|---|---|---|---|
| 4,893,602 A | | 1/1990 | Gross et al. |
| 4,911,131 A | | 3/1990 | Nakaniwa et al. |
| 5,746,183 A | * | 5/1998 | Parke et al. ................. 123/492 |
| 6,062,201 A | | 5/2000 | Nozawa et al. |
| 6,067,965 A | * | 5/2000 | Trumpy et al. ............. 123/492 |
| 6,257,206 B1 | * | 7/2001 | Doering et al. ............. 123/493 |
| 2001/0054413 A1 | * | 12/2001 | Doering et al. ............. 123/480 |
| 2002/0007823 A1 | * | 1/2002 | Machida et al. ............ 123/492 |

FOREIGN PATENT DOCUMENTS

JP  60-116840  6/1985

* cited by examiner

Primary Examiner—Erick Solis
(74) Attorney, Agent, or Firm—Nixon & Vanderhye PC

(57) ABSTRACT

A required injection time tau is calculated at intervals of 60° CA, and an injection start timing is determined according to the required injection time tau at that time at intervals of 180° CA so that fuel is taken in the cylinder by a first injection end regulation value (ATDC 60° CA). After that, at the injection start timing, the fuel injection for the (latest) required injection time tau calculated just before the start of injection is started. During the fuel injection, the required injection time tau is also calculated at intervals of 60° CA. When the calculated required injection time tau is different from the value of last time, the fuel injection time is extended or shortened according to the change amount.

10 Claims, 9 Drawing Sheets

FUEL INJECTION CONTROL SYSTEM FOR INTERNAL COMBUSTION ENGINE

CROSS REFERENCE TO RELATED APPLICATION

This application is based on and incorporates herein by reference Japanese Patent Application No. 2000-166433 filed on May 31, 2000.

BACKGROUND OF THE INVENTION

1. Field of the Invention

The present invention relates to a fuel injection control system for an internal combustion engine, having the function of correcting a fuel injection amount during fuel injection.

2. Description of Related Art

A fuel injection control system for an internal combustion engine mounted on an electronically-controlled vehicle determines a requested injection amount in accordance with operating conditions before the start of injection. The system performs fuel injection by opening a fuel injection valve only for an injection time according to the requested injection amount to supply fuel of an amount corresponding to the requested injection amount to the internal combustion engine. However, the system has the following drawback. At the time of transient driving such as acceleration or deceleration, the operating conditions change from those at the time of determination of the required injection amount (before the start of injection). Thus, the fuel injection amount at the time of transient driving deviates from the proper fuel amount corresponding to the operating conditions during the fuel injection. As a result, the air-fuel (A/F) ratio at the time of transient driving deviates from a target A/F ratio, so that drivability is worsened, and exhaust emission is not reduced.

As disclosed in JP-A-63-9646, when acceleration is detected during fuel injection, a fuel injection amount is corrected so as to be increased according to the acceleration state.

JP-A-60-116840 discloses that the required injection amount is calculated a plurality of times per intake stroke at short intervals (intervals of 45° CA(crank angle)), and the fuel injection is intermittently executed a plurality of times per intake stroke on the basis of the result of calculation.

However, JP-A-63-9646 has a drawback such that, since the fuel injection amount is corrected by being increased in expectation according to an acceleration state, the accuracy of the correction of increase at the time of acceleration deteriorates (the increase amount as the correction amount cannot be calculated with accuracy only on the basis of the accelerating state). Moreover, since the fuel injection amount is not corrected by being decreased at the time of deceleration, the fuel injection amount at the time of deceleration becomes excessive, and the A/F ratio is deviated to the rich side at the time of deceleration. The drawback is such that as the deceleration deteriorates the exhaust emission is not reduced.

In JP-A-60-116840, since the required injection amount is calculated a plurality of times per intake stroke, the time from the instance when the required injection amount is determined to the instance when the fuel injection is finished becomes shorter than that in a conventional method, so that the deviation of the fuel injection amount at the time of transient driving decreases. However, the fuel injection is performed with the required injection amount determined before the start of injection, so that the deviation of the fuel injection amount at the time of transient driving will not be solved perfectly.

SUMMARY OF THE INVENTION

An object of the present invention is to provide a fuel injection control system for an internal combustion engine, realizing improved fuel injection control accuracy (accuracy of the A/F ratio control) at the time of transient driving, and improved drivability and reduced exhaust emission at the time of transient driving.

According to the present invention, a fuel injection control system for an internal combustion engine calculates a required injection amount at an interval shorter than an injection interval by required injection amount calculating means. The control system executes fuel injection based on a required injection amount calculated just before start of the fuel injection when the fuel injection is executed by fuel injection control means. The control system calculates a required injection amount according to a driving state of the engine during the fuel injection. When a required injection amount of this time is different from that of last time, the control system extends or shortens a fuel injection time in accordance with the change amount. In the configuration, also in the fuel injection, the required injection amount according to the driving state is calculated and the fuel injection time is extended or shortened according to the change amount of the required injection amount. Thus, not only at the time of acceleration but also at the time of deceleration, the fuel injection amount can be properly corrected according to a change in the driving state. Thus, the A/F ratio at the time of transient driving can be controlled with accuracy, and improved drivability and reduced exhaust emission at the time of transient driving can be attained.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

A first embodiment of the invention will be described with reference to FIGS. 1–8.

Figure 1:
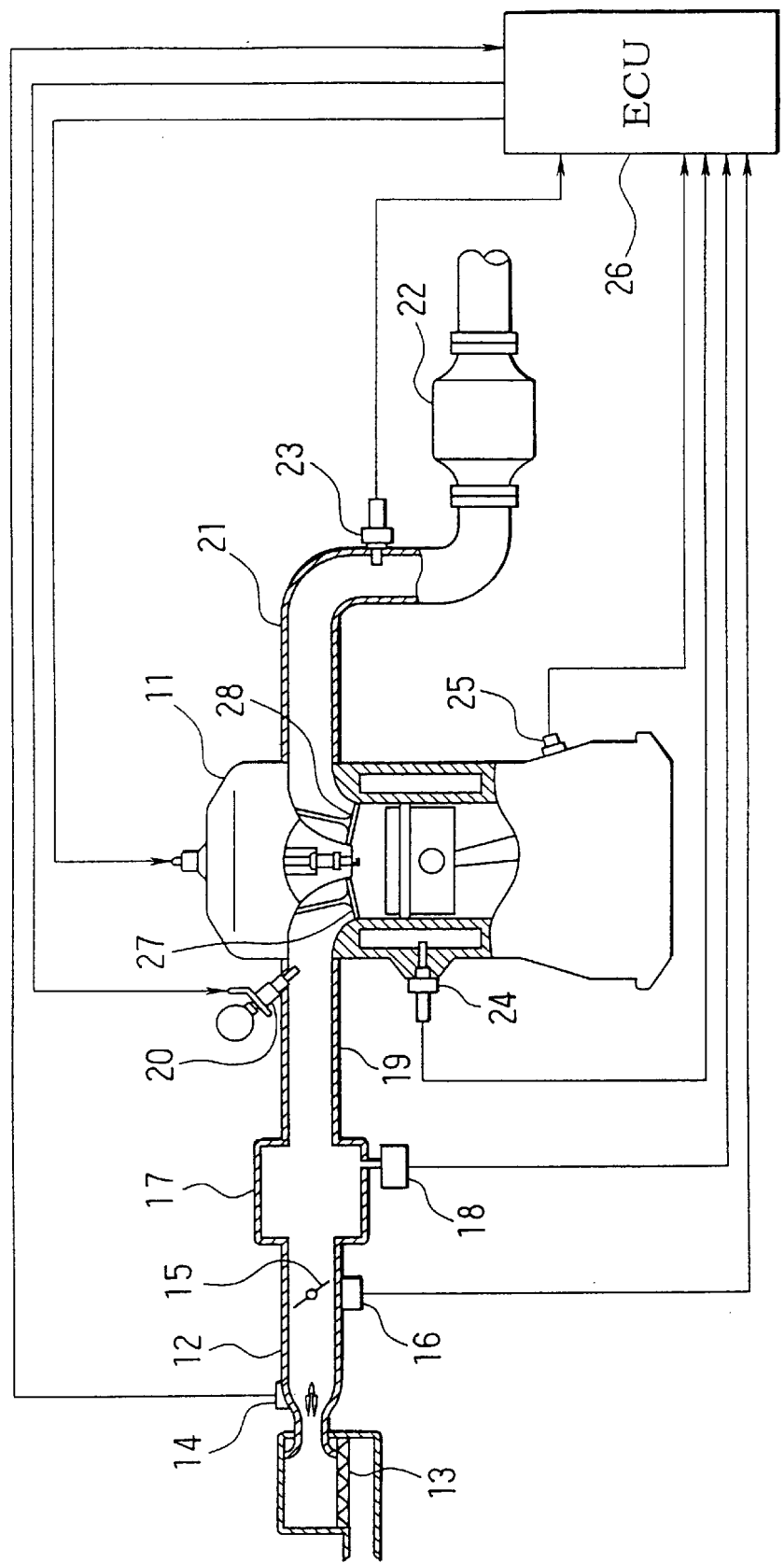
FIG. 1 is a schematic view showing a whole engine control system (first embodiment)

FIG. 1 shows a schematic configuration of a whole engine control system. In the uppermost stream part of an intake pipe 12 of an engine 11 (for example, an internal combustion engine), an air cleaner 13 is provided. On the downstream side of the air cleaner 13, an air flow meter 14 for detecting an intake air volume is provided. On the downstream side of the air flow meter 14, a throttle valve 15 and a throttle angle sensor 16 for detecting a throttle angle are provided.

Further, on the downstream side of the throttle valve 15, a surge tank 17 is provided, and the surge tank 17 is provided with an intake pipe pressure sensor 18 for detecting an intake pipe pressure. The surge tank 17 is also provided with an intake manifold 19 for introducing the air into each of the cylinders of the engine 11. Near the intake port of the intake manifold 19 of each cylinder, a fuel injection valve 20 for injecting fuel is attached.

In an exhaust pipe 21 of the engine 11, a catalyst 22 such as a three-way catalyst for reducing harmful components (CO, HC, NOx, and the like) in exhaust gas is disposed. On the upstream side of the catalyst 22, an air/fuel (A/F) ratio sensor 23 for detecting the A/F ratio of the exhaust gas is provided. To a cylinder block of the engine 11, a cooling water temperature sensor 24 for detecting the temperature of cooling water and a crank angle sensor 25 are attached. The crank angle sensor 25 outputs a pulse signal every predetermined crank angle (for example, every 30° CA), and the engine speed is detected from a generation frequency of the pulse signal.

Outputs of the various sensors are supplied to an engine control unit (hereinbelow, referred to as "ECU") 26. The ECU 26 is constructed mainly by a microcomputer and executes routines of FIGS. 2–6 stored in a built-in ROM (storage medium), thereby calculating the required injection time tau (required injection amount) at intervals (for example, intervals of 60° CA) shorter than injection intervals, executing fuel injection on the basis of the required injection time tau calculated just before the start of injection and, when the calculated required injection time tau changes from a previous value during the fuel injection, extending or shortening the fuel injection time (injection pulse width) in accordance with the change amount.

Figure 7:
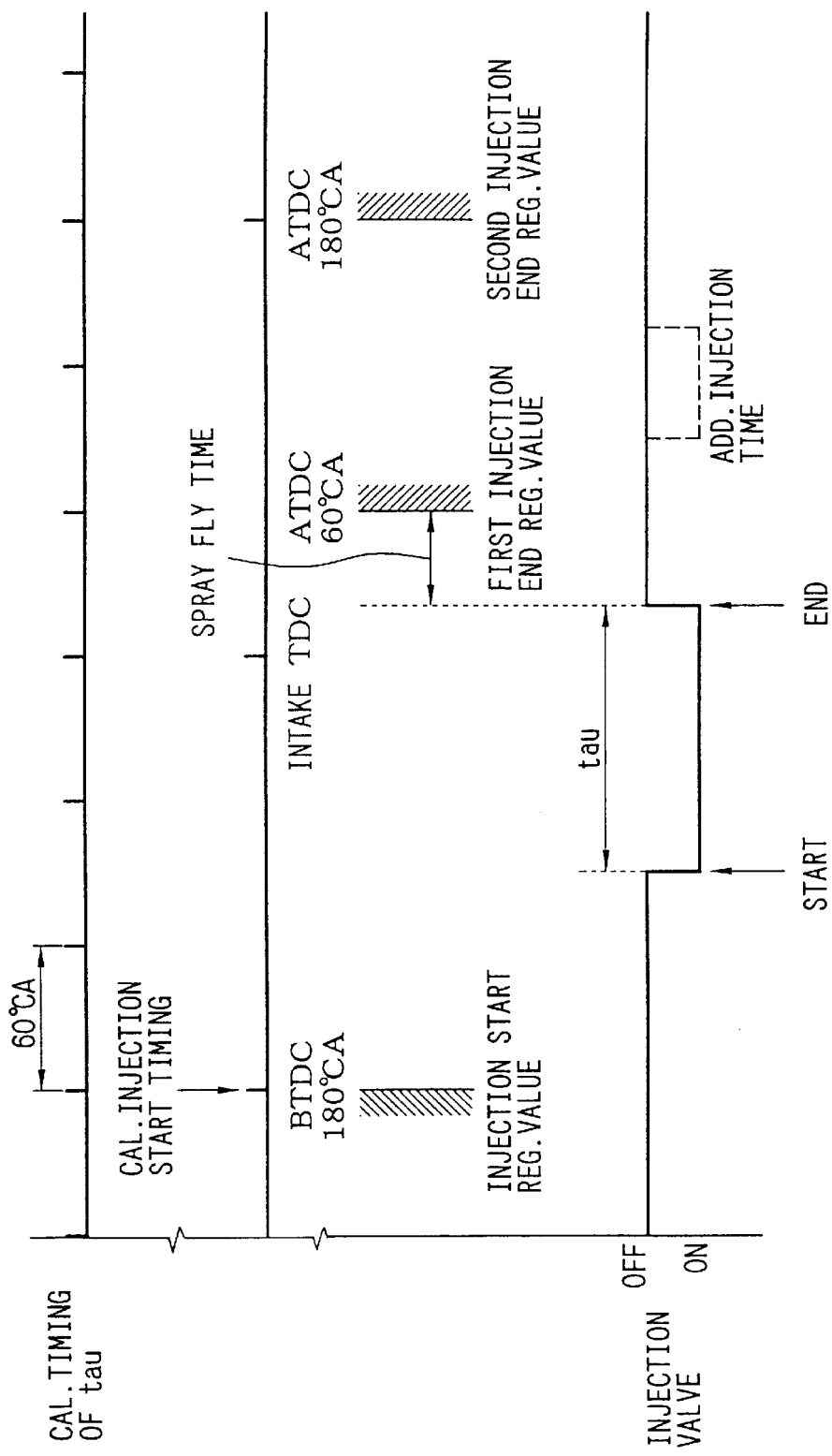
FIG. 7 is a time chart for explaining a method of determining an injection start timing and an injection end timing (first embodiment)

In the present embodiment, the injection start timing and the injection end timing are determined as follows (in the case of a four-cylinder engine as an example). As shown in FIG. 7, an injection start regulation value is set at 180° CA before (BTDC 180° CA) intake, top dead center (hereinbelow, described as "INTAKE TDC"), a first injection end regulation value is set at 60° CA after (ATDC 60° CA) the INTAKE TDC, and a second injection end regulation value is set at 18° CA after (ATDC 180° CA) the INTAKE TDC.

The period from the INTAKE TDC to ATDC 18° CA corresponds to the intake stroke. The intake valve 27 opens just before the INTAKE TDC and closes just after ATDC 180° CA (INTAKE BDC). The period from BTDC 180° CA (COMPRESSION BDC) to the INTAKE TDC corresponds to the exhaust stroke. The exhaust valve 28 opens just before BTDC 180° CA, and closes just after the INTAKE TDC. In the present embodiment, the first injection end regulation value is set at a crank angle at the time point when one third of the intake stroke has passed.

Every BTDC 180° CA of each cylinder, the injection start timing is set as follows according to the required injection time tau at that time. First, an injection end timing is determined by using the first injection end regulation value as a reference so that the fuel of the final injection at the end of injection is taken into the cylinder by the first injection end regulation value (ATDC 60° CA). Specifically, in consideration of time required to take the final injection fuel at the end of injection into the cylinder (spray fly time), the injection end timing is set earlier than the injection end regulation value only by the spray fly time. Consequently, in a steady driving mode (in the case where the fuel injection time is not extended), the injected fuel is taken into the cylinder within ⅓ of the intake stroke.

After setting the injection end timing, the injection start timing is set to a timing earlier than the injection end timing only by the required injection time tau. When the injection start timing set as described above is after the injection start regulation value (BTDC 180° CA), the injection start timing is determined as it is. When the injection start timing is before the injection start regulation value, the injection start timing is reset to the injection start regulation value, and the injection end timing is set again by using the injection start timing as a reference. In this case, the injection end timing is reset to a timing later than the injection start timing (injection start regulation value) only by the required injection time tau. The injection end timing reset as described above may be later than the first injection end regulation value (ATDC 60° CA). However, when it is later than the second injection end regulation value (ATDC 180° CA), the injection end timing is reset to the second injection end regulation value. By this operation, the fuel injection time (injection pulse width) becomes, even at the maximum, the time from the injection start regulation value (BTDC 180° CA) to the second injection end regulation value (ATDC 180° CA), and the fuel injection is completed by the end of the intake stroke.

Also after determining the injection start timing, the required injection time tau is calculated at the intervals of 60° CA. When the required injection time tau is calculated in a period from the timing at which the injection start timing is set to the injection start timing, the fuel injection is executed on the basis of the required injection time tau just before the injection start timing. Further, when the required injection time tau calculated at the intervals of 60° CA changes from the value of the last time during the fuel injection, the fuel injection time is either extended or shortened according to the change amount.

When the required injection time tau calculated in a period in which additional injection of fuel is allowed after completion of the fuel injection, that is, in the period before the second injection end regulation value (ATDC 180° CA) is longer than actual fuel injection time before the calculation, an increased amount of fuel is additionally injected. Here, the additional injection time is up to the second injection end regulation value at the maximum. Consequently, by the end of the intake stroke, all of fuel injections are completed.

The fuel injection control described above is executed according to the routines of FIGS. 2–6 by the ECU 26. The details of the processes of the routines will be described hereinbelow.

Figure 2:
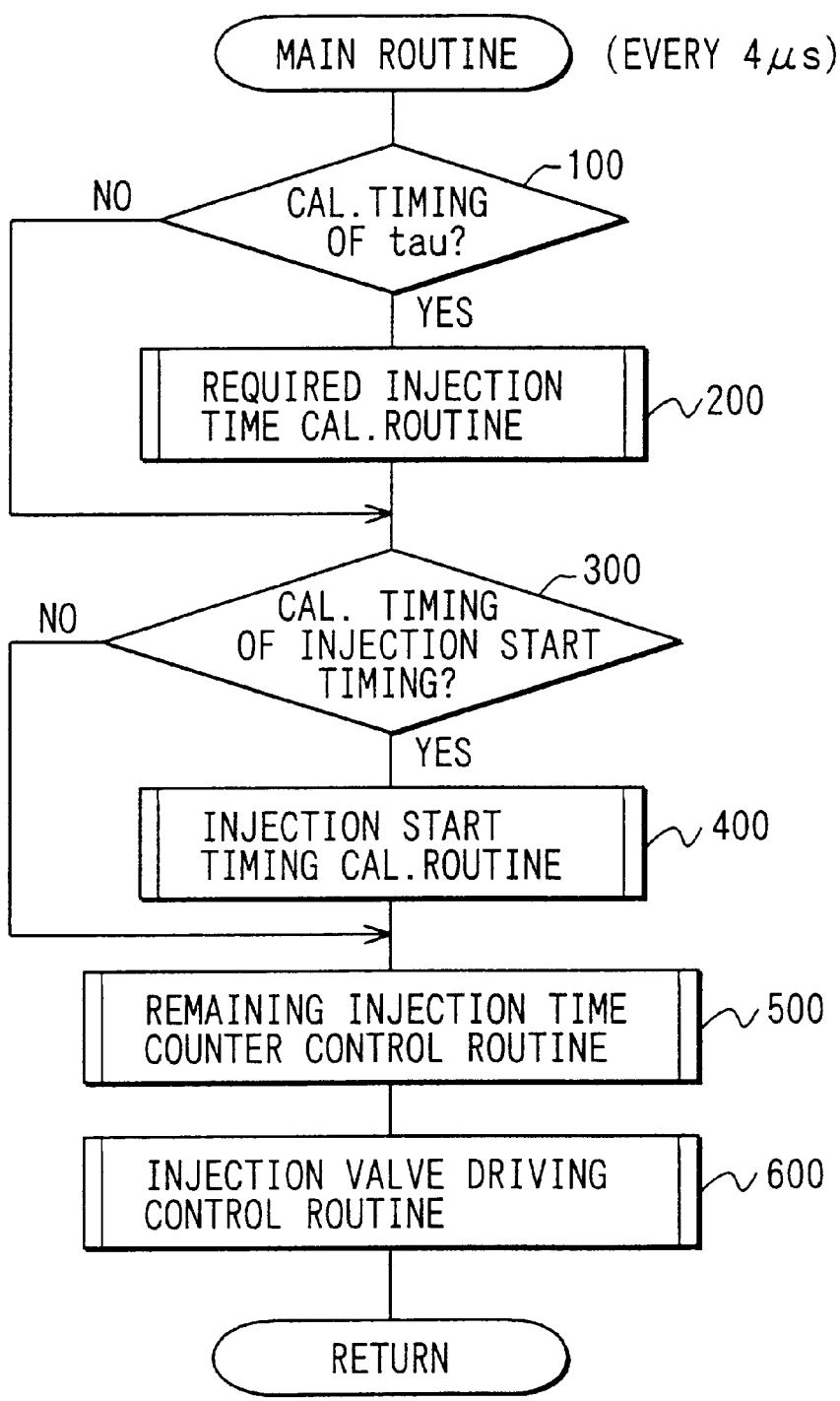
FIG. 2 is a flowchart showing the flow of processes of a main routine of fuel injection control (first embodiment)

The main routine of the fuel injection control of FIG. 2 is started in a predetermined cycle (for example, 4 µs) after start of passage of a current to a starter (not shown), and the subroutines of FIGS. 3–6 are sequentially executed by the following steps. First, in step 100, whether it is a calculation timing (every 60° CA) of the required injection time tau (required injection amount) or not is determined. When it is the calculation timing of the required injection time tau, the processing routine advances to step 200 where a required injection time calculation routine of FIG. 3 which will be described hereinlater is executed to calculate the required injection time tau at this time.

After that, the routine advances to step 300 and whether it is a calculation timing (every 180° CA) of the injection start timing or not is determined. When it is the calculation timing of the injection start timing, the routine advances to step 400 where an injection start timing calculation routine of FIG. 4 which will be described hereinlater is executed to calculate the injection start timing. After that, the routine advances to step 500 where a remaining injection time counter control routine of FIG. 5 which will be described hereinlater is executed to calculate the remaining injection time (time to the end of the injection). The routine advances to step 600 where a fuel injection valve driving control routine of FIG. 6 which will be described hereinlater is executed to control the driving (opening period) of the fuel injection valve 20.

Figure 3:
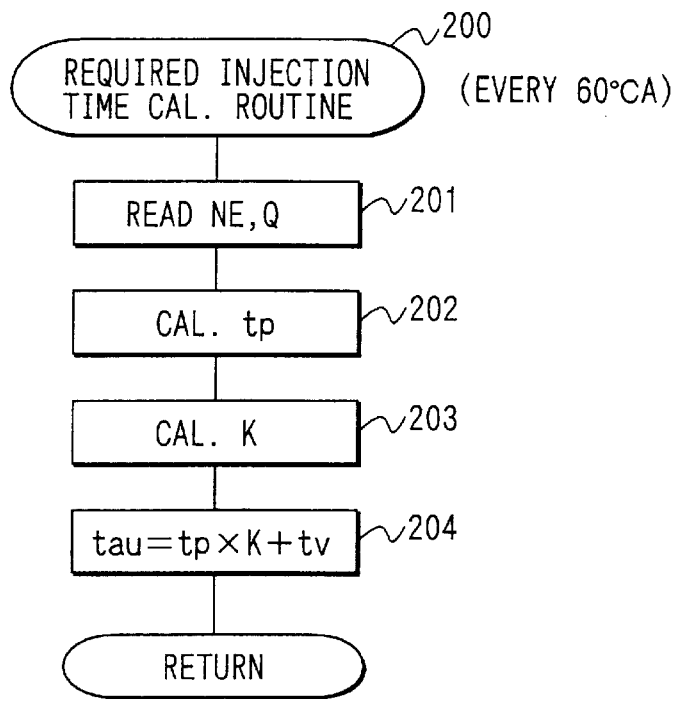
FIG. 3 is a flowchart showing the flow of processes of a required injection time calculation routine .(first embodiment)

The processes of the required injection timing calculation routine of FIG. 3 executed every 60° CA in step 200 in FIG. 2 will now be described. The routine plays the role as required injection amount calculating means in the present invention. When the routine is started, first, in step 201, engine operating conditions such as engine speed NE, intake air volume Q (or intake pipe pressure PM), and the like are read. In the following step 202, basic injection time tp of this time is calculated by a map or mathematical expression in accordance with the engine speed NE and the intake air volume Q (or intake pipe pressure PM). After that, the routine advances to step 203 where various correction factors K such as air-fuel ratio correction factor, and water temperature correction factor are calculated. In step 204, the required injection time tau is calculated by the following equation using the basic injection time tp, invalid injection time tv, and the correction factor K.

$$tau = tp \times K + tv$$

Here, the invalid injection time tv is time used to allow a response delay in the opening/closing operation of the fuel injection valve 20.

The processes of the injection start timing calculation routine of FIG. 4 executed every 180° CA (BTDC 180° CA of each cylinder) in step 400 of FIG. 2 will be described. In the routine, first, in step 401, the required injection time tau of this time is read. After that, the routine advances to step 402 where an injection end timing is calculated by using the first injection end regulation value as a reference so that the last injection fuel at the end of injection is taken into the cylinder by the first injection end regulation value (ATDC 60° CA). That is, to allow the time (spray fly time) until the fuel injected last time at the end of injection is taken in the cylinder, the injection end timing is set to a timing earlier than the injection end regulation value only by the spray fly time.

After calculating the injection end timing, the routine advances to step 403 where the injection start timing is calculated by using the injection end timing as a reference. The injection start timing is set earlier than the injection end timing only by the required injection time tau. After that, the routine advances to step 404 and whether the injection start timing is before the injection start regulation value (BTDC 180° CA) or not is determined. When the injection start timing is after the injection start regulation value, the injection start timing is determined as it is, and the routine is finished.

On the other hand, when the injection start timing is before the injection start regulation value, the routine advances to step 405 where the injection start timing is reset to the timing corresponding to the injection start regulation value. After that, the routine advances to step 406 where the injection end timing is re-calculated by using the injection start timing as a reference. Specifically, the injection end timing is set to a timing after the injection start timing (injection start regulation value) only by the required injection time tau. In step 407, whether the injection end timing is after the second injection end regulation value (ATDC 180° CA) or not is determined. When the injection end timing is before the second injection end regulation value, the injection end timing is determined as it is, and the routine is finished.

If the injection end timing is after the second injection end regulation value, the routine advances to step 408 where the injection end timing is reset to a timing corresponding to the second injection end regulation value. By the operation, the fuel injection is performed in a period from the injection start regulation value to the second injection end regulation value at the maximum, and the fuel injection is completed by the end of the intake stroke.

Figure 4:
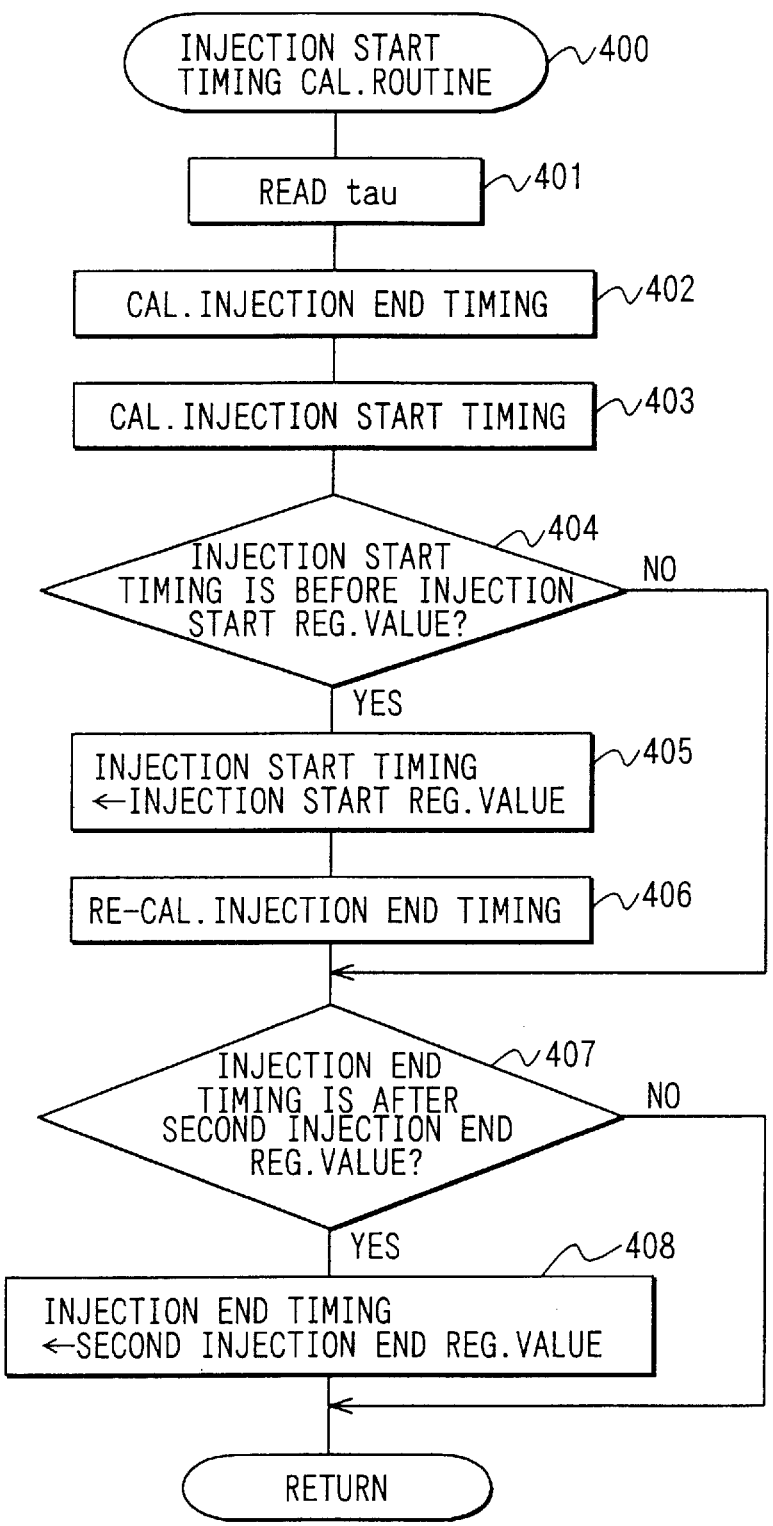
FIG. 4 is a flowchart showing the flow of processes of an injection start timing calculation routine (first embodiment)

The injection start timing calculated by the injection start timing calculation routine in FIG. 4 described above is set in an injection start timing counter (refer to FIG. 8), and decremented every predetermined period (for example, every 4 µs). At the time point when the value of the injection start timing counter becomes zero, fuel injection is started.

The processes of the remaining injection time counter control routine of FIG. 5 executed every 4 µs in step 500 in FIG. 2 will now be described. In the routine, first, in step 501, whether it is the injection start timing or not (whether the value of the injection start timing counter becomes zero or not) is determined. At the injection start timing, the routine advances to step 502 where a value corresponding to the (latest) required injection time tau just before the injection start is set in the remaining injection time counter Tinj, and the routine is finished. By setting the remaining injection time counter Tinj, the fuel injection is started according to a fuel injection valve driving control routine in FIG. 6, which will be described hereinlater.

When the routine is activated after the fuel injection is started, the routine advances from step 501 to step 503 where the fuel is being injected or not (whether the fuel injection is finished or not) is determined. When the fuel is being injected, the routine advances to step 504 where it is the calculation timing of the required injection time tau or not (every 60° CA) is determined. When it is not the calculation timing of the request injection time tau, the routine advances to step 507 where the remaining injection time counter Tinj is decremented, and the remaining injection time (time to the end of the injection) is measured.

When it is the calculation timing of the required injection time tau, the routine advances from step 504 to step 505 where a required injection time change amount Atau is calculated by subtracting the required injection time tau(i−1) of last time from the required injection time tau(i) of this time. After that, the routine advances to step 506 where the required injection time change amount Δtau is added to the value of the present remaining injection time counter Tinj to thereby update the value of the remaining injection time counter Tinj.

In this case, when the required injection time tau(i) of this time is longer than the required injection time tau(i−1) of last time, the value of the remaining injection time counter Tinj increases only by the increase amount Δtau, and the fuel injection-time is extended. On the contrary, when the required injection time tau(i) of this time is shorter than the required injection time tau(i−1) of last time, the value of the remaining injection time counter Tinj decreases only by the decrease amount Δtau, and the fuel injection time is shortened.

After updating the remaining injection time counter Tinj, the routine advances to step 507 where the remaining injection time counter Tinj is decremented, and the remaining injection time is measured. After that, the routine advances to step 508 and whether or not the fuel injection time has reached the second injection end regulation value (ATDC 180° CA) is determined. When the fuel injection time has reached the second injection end regulation value, the routine advances to step 509 where the remaining injection time counter Tinj is reset to zero, and the routine is finished. Consequently, the fuel injection time is regulated so as not to exceed the second fuel injection end regulation value.

When the routine is activated after the fuel injection is finished, the routine advances from step 503 to step 510 where it is determined whether it is in a period in which additional injection of the fuel is allowed after the fuel injection is finished or not, that is, whether it is before the second injection end regulation value (ATDC 180° CA) or not is determined. When it is after the second injection end regulation value, since the fuel injection is inhibited, the routine is finished.

On the other hand, when it is before the second injection end regulation value, the routine advances to step 511 where it is determined whether the additional injection is necessary or not. The determination is made by checking whether or not the required injection time tau calculated during the period in which the additional injection of the fuel is permitted is longer than the actual fuel injection time before the calculation. When the required injection time tau is not longer, the routine is finished as it is. When the required injection time tau is longer than the actual fuel injection time before the calculation, the routine advances to step 512 where the increased amount of the required injection time tau is set to the remaining injection time counter Tinj, and the routine is finished. After that, the additional injection of the fuel is started by the fuel injection valve driving control routine of FIG. 6, which will be described hereinlater.

During the additional injection, the process in step 504 and subsequent processes are executed. When the required injection time tau calculated during the additional injection is different from the value of last time, the additional injection time is extended or shortened according to the change amount, and the remaining injection time counter Tinj is decremented every 4 μs. The additional injection is finished when the remaining injection time counter Tinj becomes zero or reaches the second injection end regulation value (ATDC 180° CA).

The processes of the fuel injection valve driving control routine of FIG. 6 executed, for example, every 4 μs in step 600 in FIG. 2 will now be described. In the routine, first, in step 601, whether the value of the remaining injection time counter Tinj is larger than zero or not (that is, whether there is remaining injection time or not) is determined. If YES (Tinj>0), the routine advances to step 602 where the fuel injection valve 20 is maintained open to continue the fuel injection. At the time point when the value of the remaining injection time counter Tinj becomes zero, the routine advances to step 603 where the fuel injection valve 20 is closed to finish the fuel injection.

Figure 6:
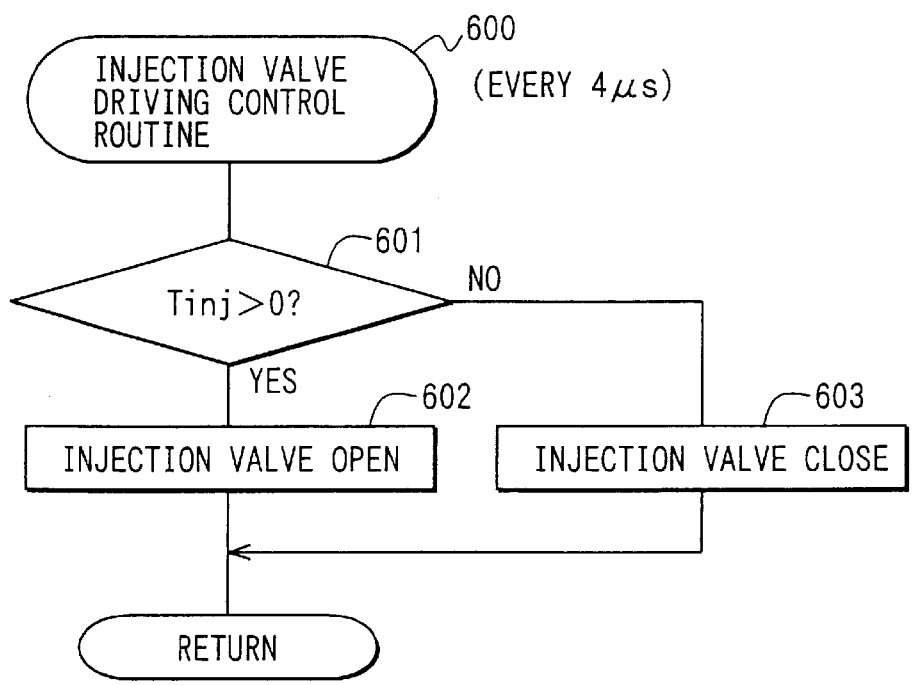
FIG. 6 is a flowchart showing the flow of processes of a fuel injection valve driving control routine (first embodiment)
Figure 5:
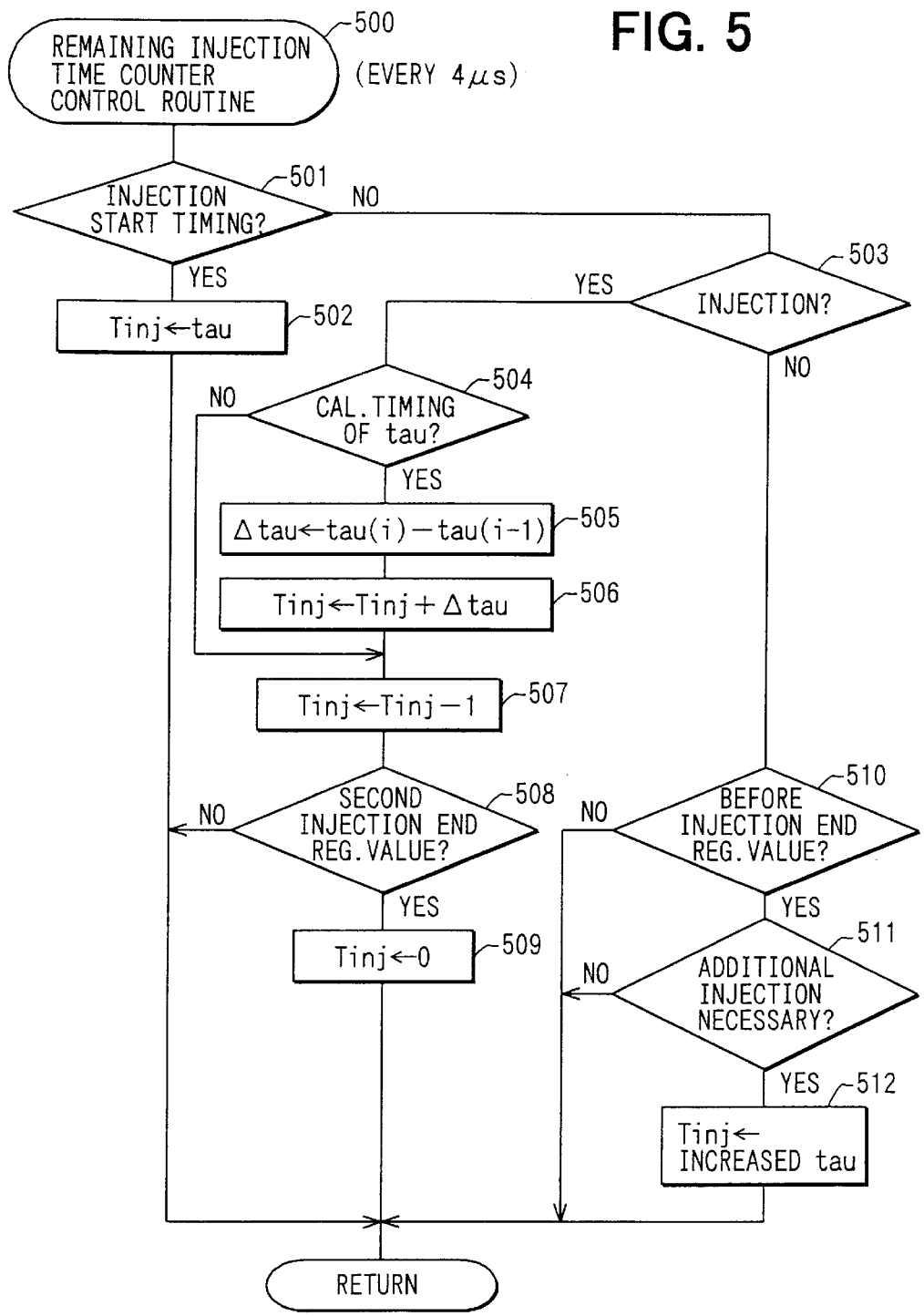
FIG. 5 is a flowchart showing the flow of processes of a remaining injection time counter control routine (first embodiment)

The routines of FIGS. 4, 5, and 6 correspond to fuel injection control means in the present invention.

Figure 8:
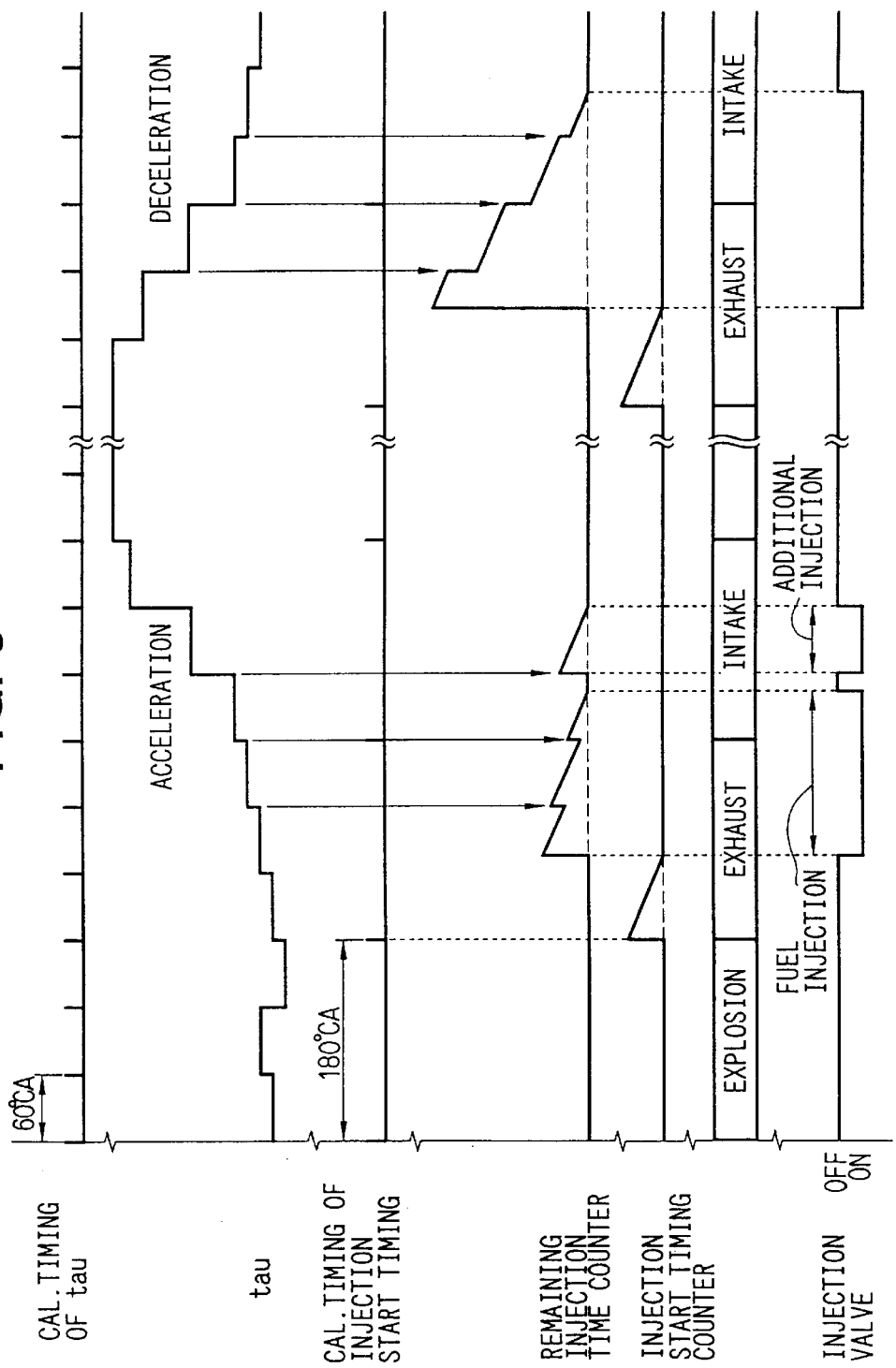
FIG. 8 is a time chart showing an example of the operation of fuel injection control (first embodiment)

The operation of the fuel injection control of the present first embodiment will be described by using the time chart of FIG. 8. During the engine operation, the required injection time tau is calculated every 60° CA, the injection start timing is determined every 180° CA (BTDC 180° CA of each cylinder) so that the fuel is taken in the cylinder by the first injection end regulation value (ATDC 60° CA) in accordance with the required injection time tau at that time, and the value corresponding to the injection start timing is set in the injection start timing counter. After that, the value of the injection start timing counter is decremented every 4 μs. At the time point when the value of the injection start timing counter becomes zero, the value corresponding to the required injection time tau just before the injection is started is set in the remaining injection time counter Tinj, and the fuel injection is started.

During the fuel injection, the value of the remaining injection time counter Tinj is decremented every 4 μs, the required injection time tau is calculated every 60° CA and, when the calculated required injection time tau is different from the value of last time, the count value of the remaining injection time counter Tinj is increased or decreased according to the change amount. Consequently, at the time of acceleration, the fuel injection time is extended according to an accelerating state. At the time of deceleration, the fuel injection time is shortened according to the decelerating state.

After that, at the time point when the value of the remaining injection time counter Tinj becomes zero, the fuel injection is finished. Also after that, the required injection time tau is calculated every 60° CA. When the required injection time tau calculated during the period in which the additional injection of the fuel is permitted, that is, in the period before the second injection end regulation value (ATDC 180° CA) is longer than the actual fuel injection time before the calculation, the increase amount of the required injection time tau is set in the remaining injection time counter Tinj, and the additional injection of the fuel is performed. The additional injection is finished at the time point when the remaining injection time counter Tinj becomes zero, or at the second injection end regulation value (ATDC 180° CA).

In the above-described first embodiment, even during the fuel injection, the required injection time tau is calculated according to the operating conditions, and the fuel injection time is extended or shortened according to the change amount of the required injection time tau. Therefore, not only at the time of acceleration but also at the time of deceleration, the fuel injection amount can be properly corrected according to a change in the operating conditions. Consequently, the A/F ratio at the time of transient driving can be controlled with accuracy, and improved drivability in the transient operation and reduced exhaust emission can be achieved.

Moreover, in the first embodiment, when the required injection time tau calculated in the period in which the additional injection of the fuel is permitted after completion of the fuel injection is longer than the actual fuel injection time before the calculation, the fuel of the amount corresponding to the increase is also additionally injected. Thus, even at the time of sudden acceleration in which the intake air volume suddenly increases, the fuel amount according to the sudden acceleration request can be attained by the additional injection, thereby improving sudden acceleration performance.

Further, in the first embodiment, every BTDC 180° CA of each cylinder, the injection start timing is set so that the injected fuel is taken into the cylinder by the first injection end regulation value (crank angle of ⅓ of the intake stroke, that is, ATDC 60° CA) in accordance with the required injection time tau at that time. Thus, the fuel in the cylinder can be sufficiently vaporized by the end of the intake stroke, the combustion state of an air-fuel mixture in the cylinder can be stabilized, and the combustion efficiency can be enhanced. Moreover, when the fuel in the cylinder vaporizes, heat of vaporization is taken from the air in-the cylinder, so that the air temperature in the cylinder decreases. Thus, the charging efficiency can be also improved.

Further, the injection end timing is regulated so that all of fuel injections (including an additional injection) are finished by the end of the intake stroke at the latest. Therefore, the fuel injection can be executed only in the period in which the fuel can be taken into the cylinder, and useless extension of the fuel injection can be avoided.

Second Embodiment

A second embodiment of the invention will now be described by referring to FIG. 9. The period of time from the timing of calculating the injection start timing (BTDC 180° CA) to a first injection end regulation value (ATDC 60° CA) varies according to the engine speed, and the engine speed changes every moment also in the period from the timing of calculating the injection start timing to the injection start. In the first embodiment, the influence of engine speed fluctuations is ignored. An injection start timing fluctuates due to the engine speed fluctuations, and the interval between the injection end timing and the first injection end regulation value (ATDC 60° CA) changes.

Figure 9:
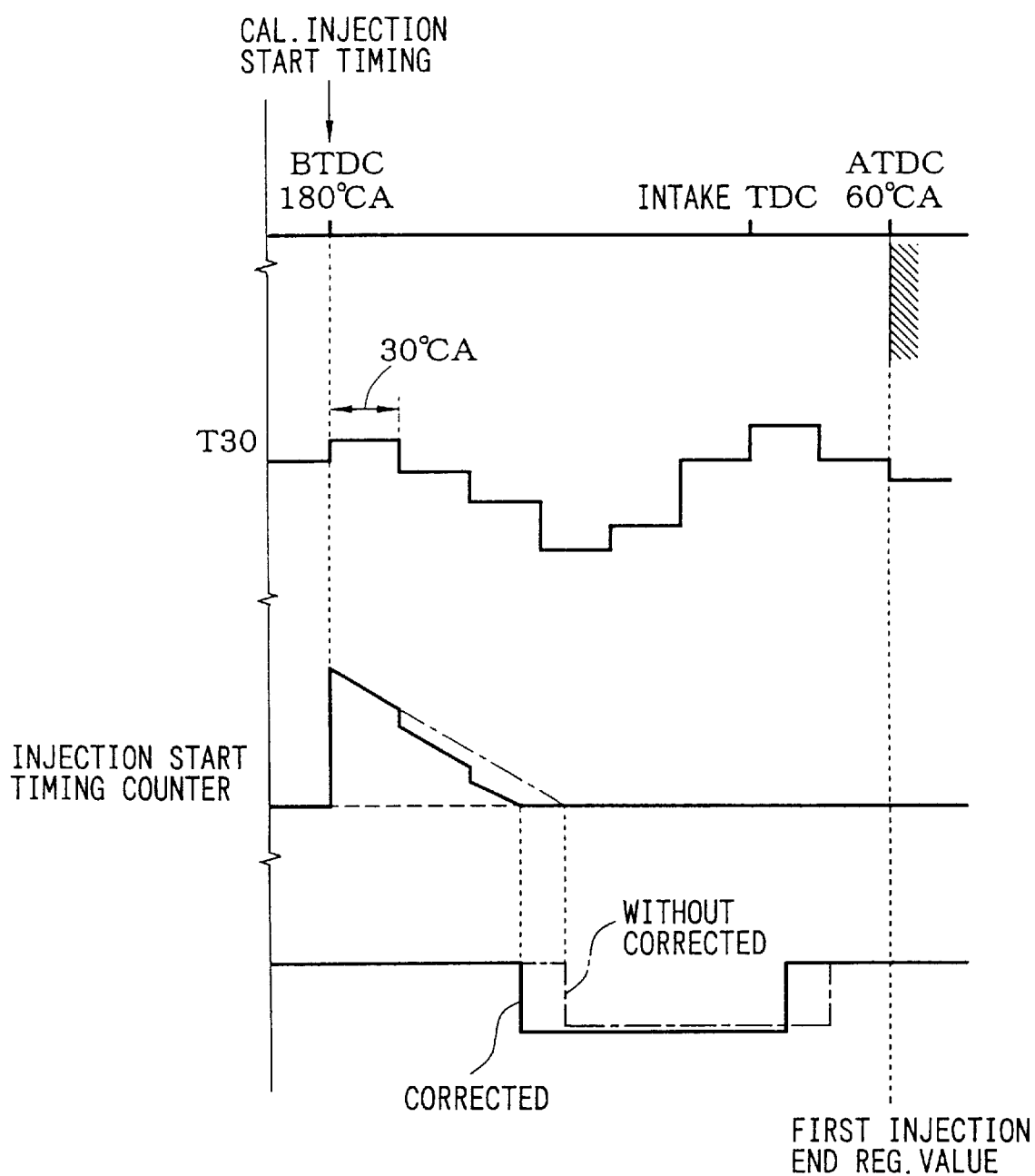
FIG. 9 is a time chart for explaining a method of correcting the injection start timing (second embodiment)

In the second embodiment shown in FIG. 9, for example, a rotation fluctuation parameter (time T30 necessary for rotation of 30° CA) is detected every 30° CA, and the count value of the injection start timing counter is corrected by using the rotation fluctuation parameter T30. By the operation, the injection start timing can be corrected according to the engine speed fluctuations, and the interval between the injection end timing and the first injection end regulation value (ATDC 60° CA) can be maintained approximately constant.

In the above-described first and second embodiments, the required injection time tau is calculated every 60° CA. Alternatively, it can be calculated more frequently or less frequently.

The larger the acceleration/deceleration is (the larger the change in engine operating conditions is), the larger the change in the required injection time tau is. Thus, it is desirable to increase the interval of calculating the required injection time tau. On the other hand, at the time of constant speed driving (steady driving mode), a change in the required injection time tau is little and gentle. Even when the interval of calculating the required injection time tau is long, the accuracy of the required injection time tau can be assured.

Third Embodiment

Figure 10:
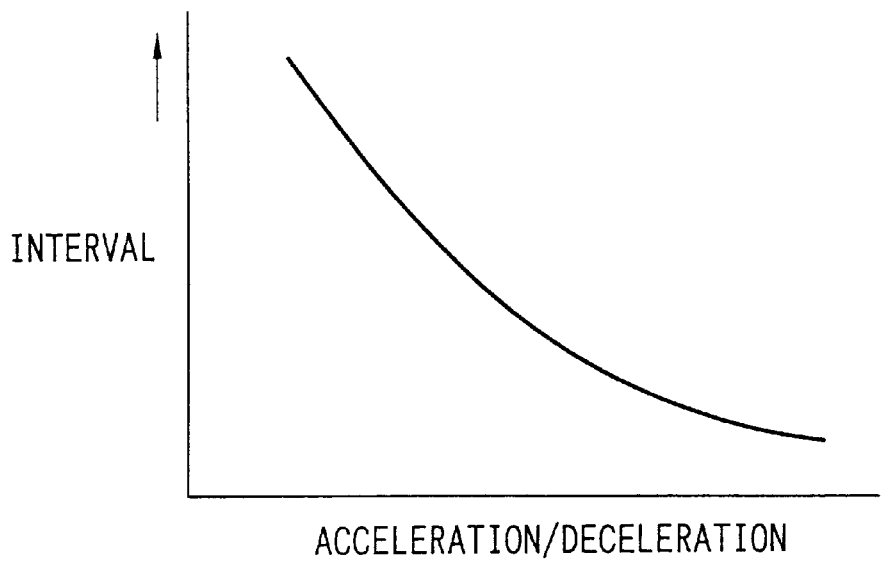
FIG. 10 is a graph showing an example of a map for calculating a computation period of required injection time tau (third embodiment)

In the third embodiment shown in FIG. 10, the interval of calculating the required injection time tau is varied according to acceleration/deceleration by using a map, a mathematical expression, or the like. It is sufficient to determine the acceleration/deceleration by using, for example, any of an engine speed fluctuation amount per unit time, an intake pipe pressure fluctuation amount per unit time, and a vehicle speed fluctuation amount per unit time.

Fourth Embodiment

Figure 11:
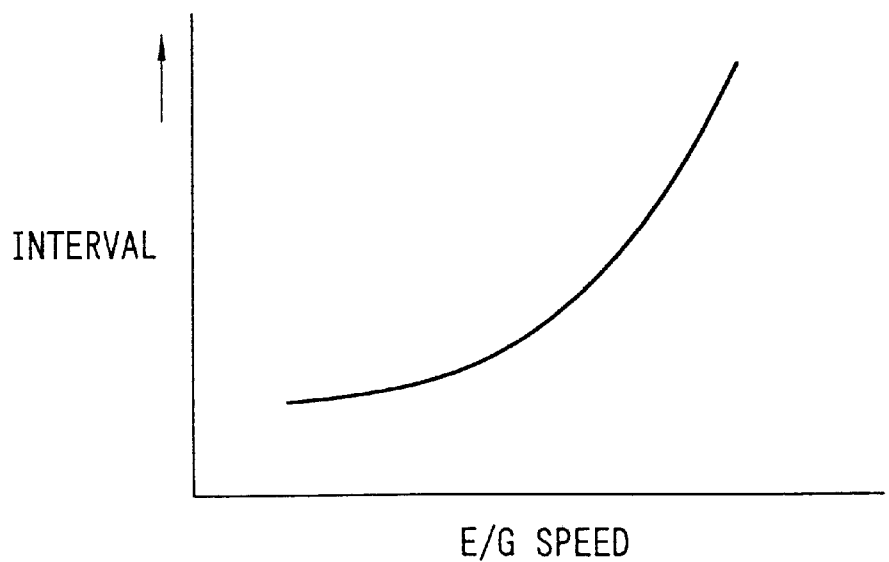
FIG. 11 is a diagram showing an example of a map for calculating a computation period of required injection time tau (fourth embodiment).

In the fourth embodiment shown in FIG. 11, the engine speed or intake pipe pressure is used as a parameter of evaluating the engine operating condition, and the interval of calculating the required injection time tau is varied by using a map, a mathematical expression, or the like in accordance with the engine speed or intake pipe pressure. In place of the intake pipe pressure, an intake air volume may be used.

As shown in FIGS. 10 and 11, by varying the interval of calculating the required injection time tau in accordance with the acceleration/deceleration, the interval of calculating the required injection time tau can be varied according to the degree of change in the required injection time tau. While reducing the load on computation by minimizing the number of times of computing the required injection time tau, the air-fuel ratio can be controlled with high accuracy.

What is claimed is:

1. A fuel injection control system for an internal combustion engine, comprising:

required injection amount calculating means for calculating a required injection amount in accordance with a driving state of the internal combustion engine; and fuel injection control means for controlling driving of a fuel injection valve to inject a fuel based on the required injection amount, wherein the required injection amount calculating means calculates the required injection amount repeatedly with an interval shorter than an interval of injection, and the fuel injection control means executes fuel injection based on the required injection amount calculated just before start of fuel injection, and when the required injection amount of this time calculated by the required injection amount calculating means changes from the required injection amount of last time calculated by the required injection amount calculating means, a fuel injection time extends or shortens in accordance with a change amount between the required injection amount of this time and the required injection amount of last time, and the fuel injection control means sets an injection start timing so that the fuel injection is finished by a predetermined timing during an intake stroke, based on the required injection amount calculated at a predetermined timing before the start of the injection, and when the required injection amount is calculated by the required injection amount calculating means in a period from a timing of setting the injection start timing to the injection start timing, the fuel injection control means executes the fuel injection based on the required injection amount just before the injection start timing, and in a case where the injection start timing is set so that the fuel injection is finished by a predetermined timing in an intake stroke and the injection start timing is before a preset injection start regulation value, the fuel injection control means resets the injection start timing to the injection start regulation value, and resets an injection end timing after the predetermined timing in the intake stroke by using the injection start timing as a reference.

2. A fuel injection control system for an internal combustion engine according to claim 1, wherein the fuel injection control means additionally executes an additional fuel injection after completion of the preceding fuel injection when the required injection amount calculated by the required injection amount calculating means becomes larger than the amount of injected fuel in the preceding fuel injection during a period in which the additional fuel injection is permitted after completion of the preceding final injection.

3. A fuel injection control system for an internal combustion engine according to claim 1, wherein the fuel injection control means corrects the injection start timing in accordance with a fluctuation in rotation of the internal combustion engine during a period from a timing of setting the injection start timing to the injection start timing.

4. A fuel injection control system for an internal combustion engine according to claim 1, wherein the fuel injection control means regulates an injection end timing so that all of fuel injections are finished by the end of the intake stroke at the latest.

5. A fuel injection control system for an internal combustion engine according to claim 1, wherein the required injection amount calculating means changes the interval of calculating the required injection amount in accordance with the acceleration/deceleration or the driving state of the internal combustion engine.

6. A fuel injection control system for an internal combustion engine, comprising:

required injection amount calculating means for calculating a required injection amount in accordance with a driving state of the internal combustion engine; and fuel injection control means for controlling driving of a fuel injection valve to inject a fuel based on the required injection amount, wherein the required injection amount calculating means calculates the required injection amount at an interval shorter than an interval of injection, and the fuel injection control means executes fuel injection based on the required injection amount calculated just before start of fuel injection, and when the required injection amount of this time calculated by the required injection amount calculating means changes from the required injection amount of last time calculated by the required injection amount calculating means, a fuel injection time extends or shortens in accordance with a change amount between the required injection amount of this time and the required injection amount of last time, and the required injection amount calculating means changes the interval of calculating the required injection amount in accordance with the acceleration/deceleration or the driving state of the internal combustion engine.

7. A fuel injection control system for an internal combustion engine according to claim 6, wherein the fuel injection control means sets an injection start timing so that the fuel injection is finished by a predetermined timing during an intake stroke, based on the required injection amount calculated at a predetermined timing before the start of the injection, and when the required injection amount is calculated by the required injection amount calculating means in a period from a timing of setting the injection start timing to the injection start timing, the fuel injection control means executes the fuel injection based on the required injection amount just before the injection start timing.

8. A fuel injection control system for an internal combustion engine according to claim 6, wherein the fuel injection control means additionally executes an additional fuel injection after completion of the preceding fuel injection when the required injection amount calculated by the required injection amount calculating means becomes larger than the amount of injected fuel in the preceding fuel injection during a period in which the additional fuel injection is permitted after completion of the preceding final injection.

9. A fuel injection control system for an internal combustion engine according to claim 7, wherein the fuel injection control means corrects the injection start timing in accordance with a fluctuation in rotation of the internal combustion engine during a period from a timing of setting the injection start timing to the injection start timing.

10. A fuel injection control system for an internal combustion engine according to claim 6, wherein the fuel injection control means regulates an injection end timing so that all of fuel injections are finished by the end of the intake stroke at the latest.

* * * * *